(12) United States Patent
Gurbuz et al.

(10) Patent No.: US 9,236,928 B1
(45) Date of Patent: *Jan. 12, 2016

(54) MEDIA ACCESS CONTROL FOR MIMO WIRELESS NETWORK

(71) Applicant: CISCO TECHNOLOGY, INC., San Jose, CA (US)

(72) Inventors: Ozgur Gurbuz, Ankara (TR); David Pignatelli, Saratoga, CA (US); David Stephenson, San Jose, CA (US); Eldad Perahia, Sunnyvale, CA (US); Bretton Douglas, Sunnyvale, CA (US); Ender Ayanoglu, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/082,666

(22) Filed: Nov. 18, 2013

Related U.S. Application Data

(63) Continuation of application No. 12/932,801, filed on Mar. 7, 2011, now Pat. No. 8,625,507, which is a continuation of application No. 11/974,848, filed on Oct. 16, 2007, now Pat. No. 7,929,412, which is a continuation of application No. 10/197,300, filed on Jul. 15, 2002, now Pat. No. 7,301,924.

(51) Int. Cl.
| | |
|---|---|
| *H04B 7/08* | (2006.01) |
| *H04B 7/06* | (2006.01) |
| *H04W 28/18* | (2009.01) |
| *H04B 7/04* | (2006.01) |
| *H04W 28/22* | (2009.01) |
| *H04W 84/12* | (2009.01) |

(52) U.S. Cl.
CPC ............ *H04B 7/0689* (2013.01); *H04B 7/0413* (2013.01); *H04B 7/0871* (2013.01); *H04W 28/22* (2013.01); *H04B 7/0628* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 5,636,220 | A | 6/1997 | Vook et al. |
| 6,067,290 | A | 5/2000 | Paulraj et al. |
| 6,144,711 | A | 11/2000 | Raleigh et al. |
| 6,741,587 | B2 | 5/2004 | Holma et al. |
| 6,754,195 | B2 | 6/2004 | Webster et al. |
| 6,760,882 | B1 | 7/2004 | Gesbert et al. |

(Continued)

OTHER PUBLICATIONS

IEEE Standard 802.11a-1999."Part II:Wireless LAN Medium Access Control(MAC)and Physical Layer (PHY)specifcations Highspeed Physical Layer in the 5 GHZ Band,"Sep. 1999,pp. 1-8.

*Primary Examiner* — Marcus R Smith
(74) *Attorney, Agent, or Firm* — Cindy Kaplan

(57) ABSTRACT

An apparatus and method for operating a Multiple Input Multiple Output (MIMO)-capable subscriber node are disclosed. In one embodiment, an apparatus includes a MIMO-capable physical layer transceiver and a Medium Access Control (MAC) layer block that measures a received transmission to determine channel conditions. Upon receiving a transmission wherein said channel conditions meet specified conditions, the MAC layer block transmits a message to an access point indicating that the apparatus wants to switch between a non-MIMO mode and a MIMO mode, and upon receiving an acknowledgement, the MAC layer block switches between the non-MIMO mode and the MIMO mode. An apparatus for operating an access node is also disclosed.

20 Claims, 8 Drawing Sheets

(56) References Cited

U.S. PATENT DOCUMENTS

| | | |
|---|---|---|
| 6,802,035 B2 | 10/2004 | Catreux et al. |
| 6,990,116 B1 | 1/2006 | Young et al. |
| 7,020,110 B2 | 3/2006 | Walton et al. |
| 7,248,841 B2 | 7/2007 | Agee et al. |
| 2002/0183010 A1 | 12/2002 | Catreux et al. |
| 2002/0193146 A1* | 12/2002 | Wallace et al. ............... 455/562 |
| 2003/0072452 A1 | 4/2003 | Mody et al. |
| 2003/0076777 A1 | 4/2003 | Stuber et al. |
| 2003/0169769 A1* | 9/2003 | Ho et al. ....................... 370/473 |
| 2003/0185241 A1 | 10/2003 | Lu et al. |
| 2003/0235149 A1* | 12/2003 | Chan et al. .................... 370/206 |
| 2004/0022219 A1 | 2/2004 | Mangold et al. |
| 2004/0087275 A1* | 5/2004 | Sugar et al. ..................... 455/61 |
| 2005/0117543 A1* | 6/2005 | Heath et al. ................... 370/329 |

\* cited by examiner

MEDIA ACCESS CONTROL FOR MIMO WIRELESS NETWORK

The present application is a continuation of U.S. patent application Ser. No. 12/932,801, filed Mar. 7, 2011, which is a continuation of U.S. patent application Ser. No. 11/974,848, filed Oct. 16, 2007, (U.S. Pat. No. 7,929,412, issued Apr. 19, 2011), which is a continuation of U.S. patent application Ser. No. 10/197,300, filed Jul. 15, 2002 (U.S. Pat. No. 7,301,924, issued Nov. 27, 2007), which are incorporated herein by reference in their entirety.

The present application is related to the subject matter of U.S. Pat. No. 6,377,631, issued on Apr. 23, 2002, and entitled "TRANSMITTER INCORPORATING SPATIO-TEMPORAL PROCESSING," the contents of which are incorporated by reference herein for all purposes in their entirety.

BACKGROUND

The present embodiments relate generally to communications and more particularly to systems and methods for wireless communications.

As the Internet continues its development and as workers and consumers increasingly rely on data networking to assist their day-to-day tasks, a need arises to extend network connectivity to locations where there is no convenient connection to a wired infrastructure. Workers desire to send and receive email and access the Internet and their corporate intranet even when they are away from their workstation. Consumers wish to establish home networks without costly and cumbersome wiring. Accordingly, wireless communication standards have evolved including the IEEE 802.11 family.

The current IEEE 802.11a standard allows for wireless communicates at speeds between 6 Mbps and 54 Mbps. It is desirable to further increase these speeds to accommodate delivery of multimedia wireless services and facilitate outdoor wireless bridging between indoor networks. It is also desirable to accommodate the increased data rates by increasing spectral efficiency rather than by increasing bandwidth.

One known way of increasing spectral efficiency is the use of MIMO (Multiple Input Multiple Output) processing techniques. MIMO techniques take advantage of multiple antennas (or multiple polarizations of the same antenna) at the transmitter and receiver to access multiple channel inputs and channel outputs and thereby define multiple spatial subchannels that occupy the same bandwidth but nonetheless are capable of carrying independent data streams. The delineation of the multiple spatial subchannels may involve weighting of the antenna inputs at the transmitter end and/or weighting of the antenna outputs at the receiver end. For further information on MIMO techniques, see U.S. Pat. No. 6,377,631.

It is desirable to apply MIMO techniques to IEEE 802.11 systems to increase data carrying capacity but there are obstacles to overcome. The 802.11 standards do not specify MIMO transmission techniques. It is desirable, and probably commercially essential, to construct wireless communication devices that cannot only interoperate with MIMO-capable devices but also with standards-defined devices that are not MIMO-capable. It is also desirable to modify the media access control (MAC) layer of standards such as the 802.11 standard to facilitate MIMO communications and allow 802.11 networks and other networks to benefit from increased capacity.

DESCRIPTION OF EXAMPLE EMBODIMENTS

Overview

By virtue of one embodiment, a MAC layer of a wireless communication standard is modified to facilitate MIMO (multiple input multiple output) processing and thereby increase capacity and/or spectral efficiency. In one implementation, the IEEE 802.11a standard is modified in this way. An access point may maintain a list of nodes operating in MIMO mode and nodes operating in non-MIMO mode.

One embodiment provides a method for operating an access node in a wireless communication system having nodes operating in a MIMO mode and nodes operating in a non-MIMO mode.

Another embodiment provides a method of operating a MIMO-capable subscriber node.

Further understanding of the nature and advantages of the inventions herein may be realized by reference to the remaining portions of the specification and the attached drawings.

Example Embodiments

Although having very broad applicability, the present invention will be described with reference to a representative network environment, a wireless communication network based on the IEEE 802.11 standard, and in one particular implementation, the IEEE 802.11a standard. The IEEE 802.11g standard is another example of a wireless communication standard to which embodiments of the present invention may be applied. Familiarity with the technical details of these standards will be assumed in the discussion that follows. Relevant descriptive materials regarding the IEEE 802.11 standard may be found in the following documents:

Information technology—Telecommunications and information exchange between systems—Local and metropolitan area networks specific requirements—Part 11: Wireless LAN Medium Access Control (MAC) and Physical Layer (PHY) Specifications (1999).

Information technology—Telecommunications and information exchange between systems—Local and metropolitan area networks specific requirements—Part 11: Wireless LAN Medium Access Control (MAC) and Physical Layer (PHY) Specifications (1999): High Speed Physical Layer in the 5 GHz band.

The contents of these standards documents are herein incorporated by reference for all purposes in their entirety.

Figure 1:
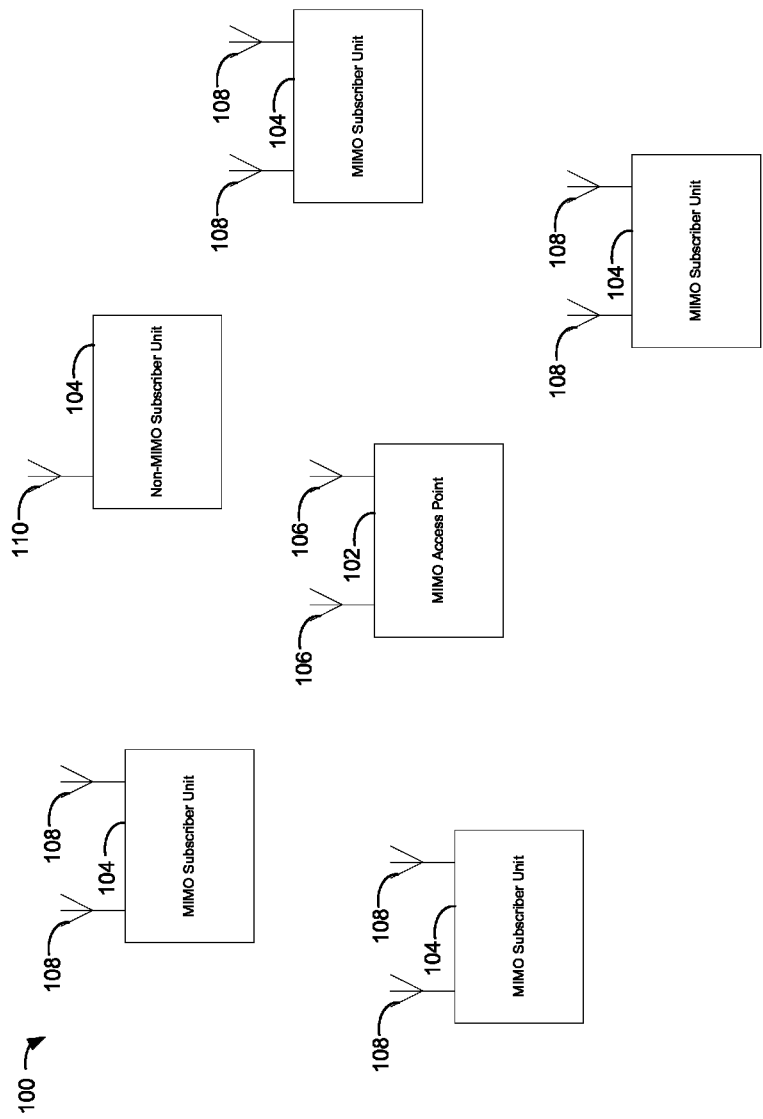
FIG. 1 depicts a wireless communication network according to one embodiment of the present invention.

FIG. 1 depicts a wireless network 100 suitable for implementing one embodiment of the present invention. Included within wireless network 100 are an access point 102 and numerous subscriber units 104. In one application, subscriber units 104 are themselves wireless bridges to other wireless networks. For example, network 100 may be an outdoor wireless backbone interconnecting a number of in-building wireless networks.

Access point 102 is equipped with two antennas 106. Alternatively, the two depicted antennas 106 actually signify the use of two polarizations of the same antenna. Some, but not all, of subscriber units 104 are also equipped with two antennas 108 or able to exploit dual polarizations. These subscriber units are capable of MIMO communications with access point 102. Other subscriber units have but a single antenna 110 and are therefore not capable of MIMO communications. The MIMO-capable subscriber units may operate in MIMO mode or conventional "SISO" (Single Input Single Output) mode depending on channel conditions as will be explained.

In one implementation, access point 102 and subscriber units 104 communicate in accordance with the IEEE 802.11a standard. Operation is typically in accordance with so-called "infrastructure" mode where communication is either to or from access point 102 rather than between subscriber units 104. Furthermore, access point 102 and the MIMO-capable ones of subscriber units 104 incorporate MIMO-related extensions as described below.

Figure 2:
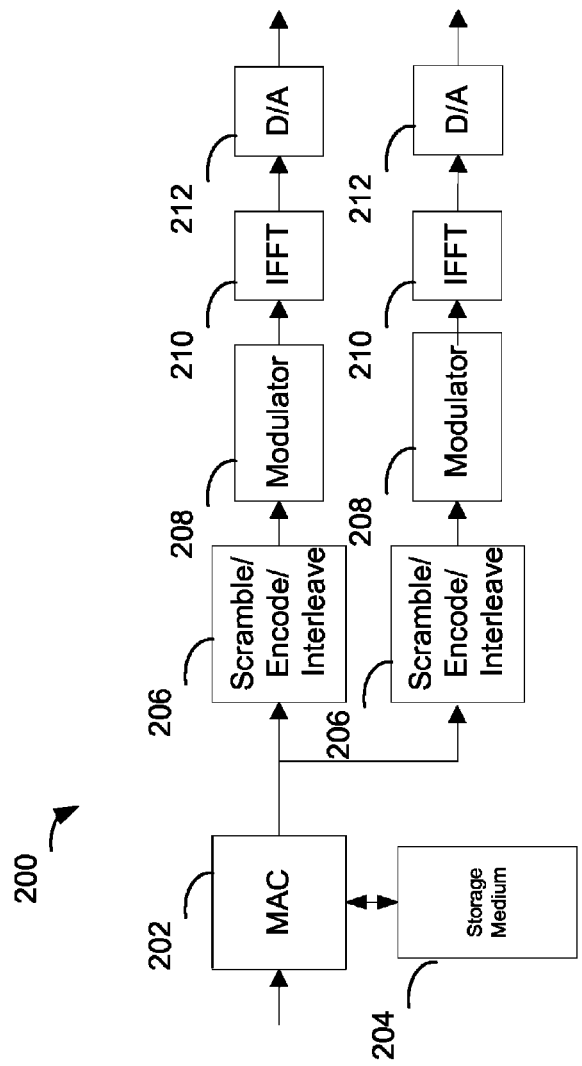
FIG. 2 depicts elements of a wireless transmitter according to one embodiment of the present invention.

Each of access points 102 and subscriber units 104 incorporates both a transmitter and a receiver. FIG. 2 depicts elements of a transmitter 200 as would be used in MIMO operation in accordance with one embodiment of the present invention. A MAC layer processor 202 performs functions relating to coordinating access to the wireless transmission medium in accordance with the IEEE 802.11a standard as extended to accommodate MIMO processing. MAC layer processor 202 also acts as an interface between physical layer elements and higher layer protocols that sink and source data. The exact functions of MAC layer processor 202 will vary depending on whether transmitter 200 is operating in an access point 102 or subscriber unit 104.

MAC layer processor 202 may be implemented in any suitable manner, e.g., as an ASIC, FPGA, a programmable processor operating suitable software, etc. If MAC layer processing is based on software, the software to implement MAC layer functions may be stored on a computer-readable storage medium 204. Computer-readable storage medium 204 may represent on-chip or off-chip ROM, RAM, etc. Other storage media such as floppy disks, or CD-ROMs, may be used to store software useful in implementing embodiments of the present invention.

When operating in MIMO mode, transmitter 202 transmits at twice the data rate of conventional 802.11a units given the same selection of constellation and coding rate. Accordingly, the MAC layer packet is twice as large but divided into 2 for transmission via 2 spatial subchannels. Also, the length field of the physical layer header (PLCP header in 802.11 terminology) is set to ½ of the length of the MAC layer packet. If half the MAC layer packet length is not an integer, the length field is set to the next largest integer.

After division of the MAC layer packet into two, further physical layer processing is duplicated for each spatial subchannel. Each packet half is given its own PLCP preamble that includes the symbols used for training and synchronization in accordance with the 802.11a standard. For each spatial subchannel, there is a scramble/encode/interleave block 206 that performs error correction coding, scrambling, and interleaving in accordance with the 802.11a standard. A modulator 208 maps bits to particular constellation points corresponding to each subcarrier position within an OFDM (Orthogonal Frequency Division Multiplexing) symbol. Pilot and zero subcarriers are inserted as required by the standard. An IFFT block 210 converts sets of subcarrier values to time domain samples representing an OFDM symbol using the inverse Fast Fourier transform. Preamble training symbols are inserted as required. A digital to analog converter 212 converts the time domain sample stream to an analog signal.

Further analog processing at one or more intermediate frequencies (IFs) and at the transmission radio frequency (RF) is also duplicated for each subchannel. In one embodiment, each subchannel RF output is connected to a different polarization of the same antenna. Alternatively, the RF outputs can drive different antennas.

In more complex, MIMO processing schemes, a 2×2 matrix weighting processor is used to convert the time domain sample streams output of each spatial subchannel to the signals driving each antenna or antenna polarization. The weighting matrix may be derived from a channel estimate, a channel estimate enhanced with SINR (signal to interference plus noise ratio) information, etc. Also, the weighting matrix may be adjusted prior to the IFFT and adjusted for each subcarrier.

When operating in a SISO mode, transmitter 200 may make use of only a single chain of blocks 206, 208, 210, and 212 and a single IF/RF chain. Only a single antenna polarization is used then.

Figure 3:
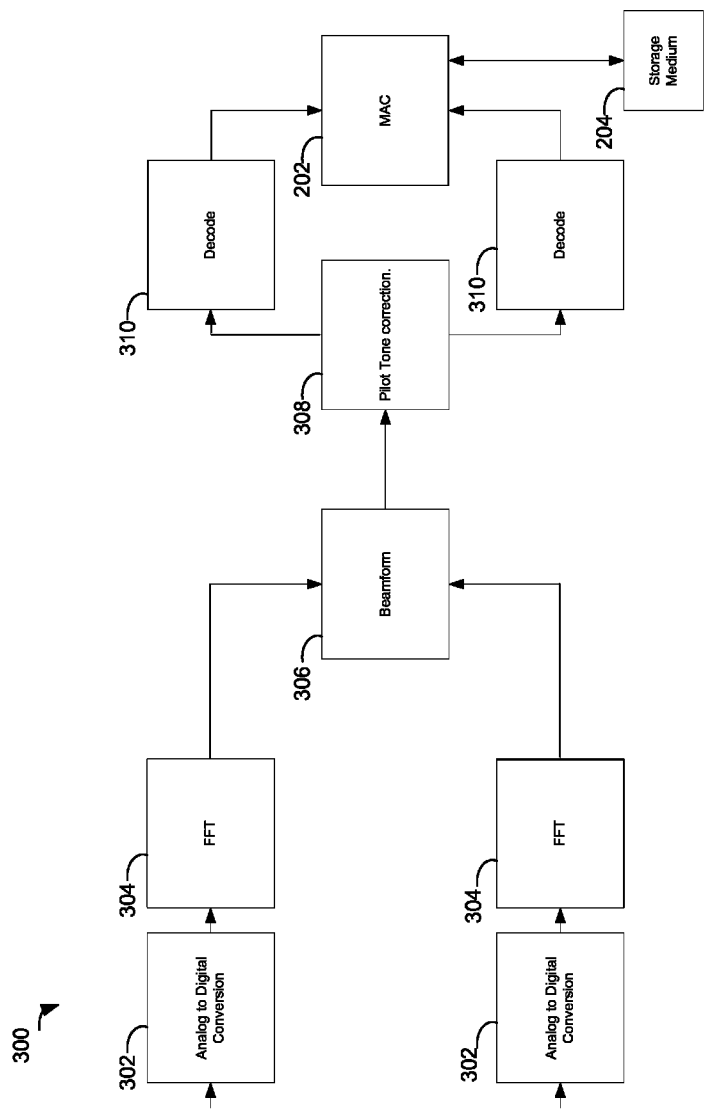
FIG. 3 depicts elements of a wireless receiver according to one embodiment of the present invention.

FIG. 3 depicts a receiver 300 as would be used in one access point 102 or one of the MIMO-capable ones of subscriber units 104. Individual RF/IF chains (not shown) are connected to each antenna (or antenna polarization) to recover analog signals suitable for conversion to digital samples from the RF signals received over the airwaves. There is an analog to digital converter 302 for each analog signal to recover digital samples. There are also two parallel FFT blocks 304 to perform time to frequency conversion and recover the subcarrier values for each OFDM symbol. Components to perform time and frequency synchronization in accordance with the 802.11a standard are omitted for simplicity of explanation.

The subcarrier values corresponding to each antenna or polarization are input to a beamformer 306. Beamformer 306 recovers the transmitted spatial subchannel data streams by applying a weighting matrix to the beamformer inputs. The weighting matrix may be based on a matrix channel estimate and possibly also on (signal to interference plus noise ratio) SINR. There are many suitable ways of implementing the weighting matrix but this type of detail is not relevant to a discussion of the present invention. A pilot tone correction block 308 corrects phase offset among subcarriers within each OFDM symbol in accordance with the 802.11a standard. For each spatial subchannel, a decode block 310 performs error correction decoding, descrambling, and deinterleaving to reverse the corresponding processes at the transmit end. The outputs of decode block 310 are recombined into MAC layer packets by MAC layer processor 202 which is shared with transmitter 200. FIG. 3 is depicted with reference to MIMO operation. For SISO operation, a single conventional 802.11a receiver chain is used without any beamforming processing.

Figure 4:
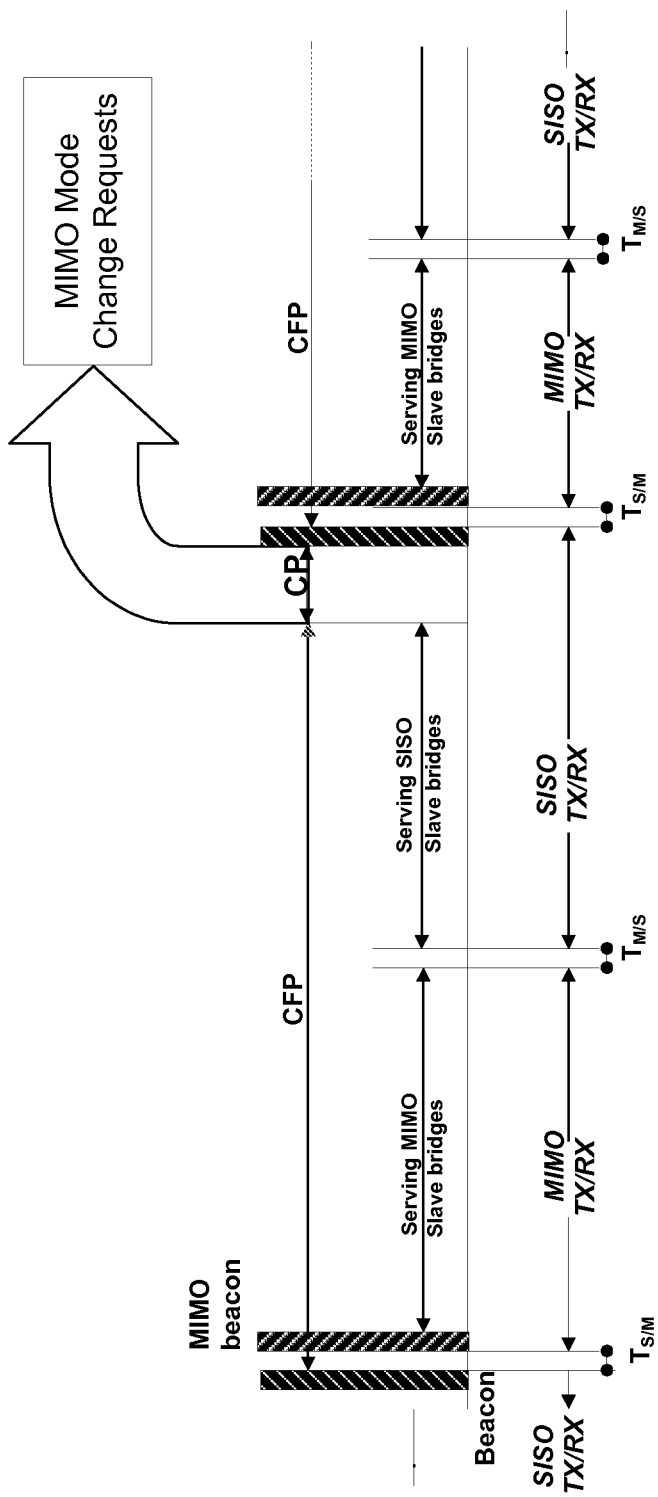
FIG. 4 depicts time domain allocations to facilitate MIMO communication according to one embodiment of the present invention.

FIG. 4 depicts the operation of wireless network 100 in the time domain according to one embodiment of the present invention. It will be appreciated that the operation of wireless network 100 shares features in common with conventional 802.11 "infrastructure mode" networks. Transmission time is divided between a contention period (CP) and a contention free period (CFP). During the CP devices transmit when they do not hear other transmissions. During the CFP, access point 102 controls access to the transmission medium and polls individual subscriber units 104 to transmit data that they may have. Downstream data may be sent along with polling information.

In 802.11 operation, each CFP begins with a special beacon frame that defines the beginning of the CFP and indicates its duration. According to one embodiment of the present invention, this beacon is followed by a special MIMO beacon that is transmitted in MIMO mode whereas the first beacon is transmitted in SISO mode. MIMO-capable subscriber units that are in SISO mode listen to the first beacon to learn about the length of the CFP but temporarily switch to MIMO mode to monitor the MIMO beacon and make measurements on the MIMO beacon preamble to estimate MIMO channel conditions. These measurements help determine whether they should in fact switch from SISO mode to MIMO mode. In one embodiment, cross-polarization discrimination (XPD) between the two spatial subchannels is measured and if XPD is sufficiently high, the subscriber unit will switch over to take advantage of the greater capacity available in MIMO mode. In an alternative embodiment, error vector magnitude (EVM) is determined and if it is sufficiently high, the subscriber unit will switch over. The EVM measurement takes into effect all of the wireless medium channel impairments, noise, interference, and cross-polarization discrimination.

MIMO-capable subscriber units in MIMO mode will receive all relevant beacon information from the MIMO beacon when in MIMO mode. Non-MIMO-capable subscriber units will not be capable of receiving the MIMO beacon and will typically ignore it as directed by the SISO beacon parameters. A short time period TS/M separates the two beacons.

Access point 102 maintains of lists of subscriber units operating in MIMO node and subscriber units operating in SISO mode (including non-MIMO-capable subscriber units.) The CFP is divided into two subperiods. In a first subperiod, access point 102 communicates with the subscriber units that are operating in MIMO mode. In a second subperiod, access point 102 communicates with the subscriber units that are operating in SISO mode. A time TM/S separates the subperiods. Subscriber units 104 communicate data in response to a polling request from access point 102 as defined by the IEEE 802.11 standard and/or they receive downstream data from access point 102. The division of the CFP into subperiods reduces the number of time-consuming mode changes for access point 102 to the minimum. If there is time left in the CFP, access point 102 can repeat the subperiods to fill up the available time. Upon completion of the CFP, access point 102 transmits the 802.11-defined CF-End message in both SISO mode and MIMO mode so that all units know that the contention period (CP) will begin.

In one embodiment, all CP transmissions occur in SISO mode. According to the present invention, these may include specially modified messages for affiliating to the network as a MIMO-capable node and for requesting and acknowledging mode shifts. In particular, embodiments of the present invention may take advantage of Association, Reassociation, Disassociation Request, and Response Frames as specified by 802.11. These frames may be augmented with a special MIMO information element. In one implementation, this MIMO information element has a length of 1 octet. The least significant bit indicates SISO operation or MIMO operation while the remaining bits can be used for version identification.

Figure 5:
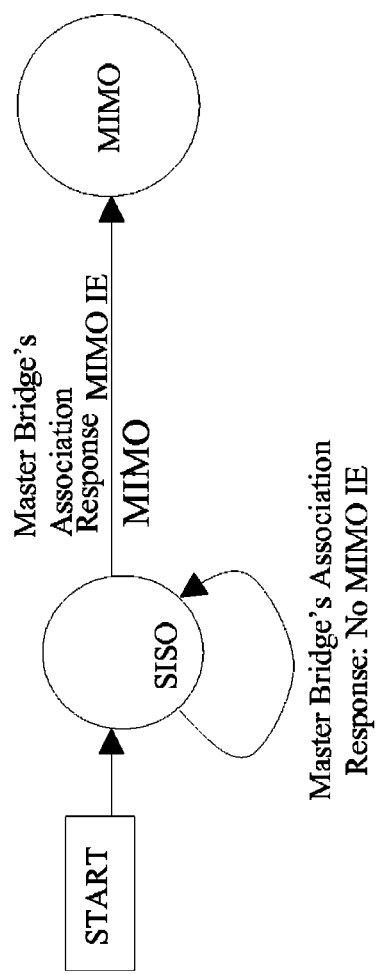
FIG. 5 is a state transition diagram depicting how a MIMO-capable node may affiliate to a network according to one embodiment of the present invention.

When a MIMO-capable subscriber unit starts up, it transmits an Association Request to access point 102 in accordance with 802.11a. However, this Association Request includes a MIMO information element that specifies MIMO mode operation in accordance with the present invention. Access point 102 replies with an Association Response message that also includes the MIMO information element specifying MIMO mode operation. The subscriber unit then switches to MIMO mode and access point 102 adds the subscriber unit to the list of MIMO-capable subscriber units. If the subscriber unit joins a network where the access point is not MIMO-capable, the received Association Response will lack the MIMO information element and the subscriber unit will therefore remain in SISO mode. This preserves backward compatibility with non-MIMO equipment. FIG. 5 depicts a state transition diagram showing start up for a MIMO-capable subscriber unit.

MIMO-capable subscriber units preferably switch between MIMO-mode and SISO-mode depending on channel conditions. In one embodiment, when in MIMO mode, the subscriber unit measures an indicator of the isolation of the two spatial subchannels. In embodiments where antenna polarizations are utilized to establish the spatial subchannels, cross-polarization discrimination (XPD) may be used. These measurements are made on MIMO transmissions from access point 102 while the subscriber unit is in MIMO mode. In one implementation, the measurements are made on a special preamble incorporated into the MIMO transmissions. When the subscriber unit is in MIMO mode, it may make this measurement on any downstream transmission. When the subscriber unit is otherwise in SISO mode, it will temporarily shift to MIMO mode to make this measurement on the MIMO beacon.

Before switching between MIMO mode and SISO mode, a subscriber unit performs a handshake with access point 102 via a Reassociation Request/Response exchange during the CP. As earlier indicated, all transmissions during the CP are SISO transmissions regardless of the current mode of the subscriber unit. The Reassociation Request and Reassociation Response messages will include the above-mentioned MIMO information element with the appropriate bit set to reflect the new mode of the subscriber unit.

Figure 6:
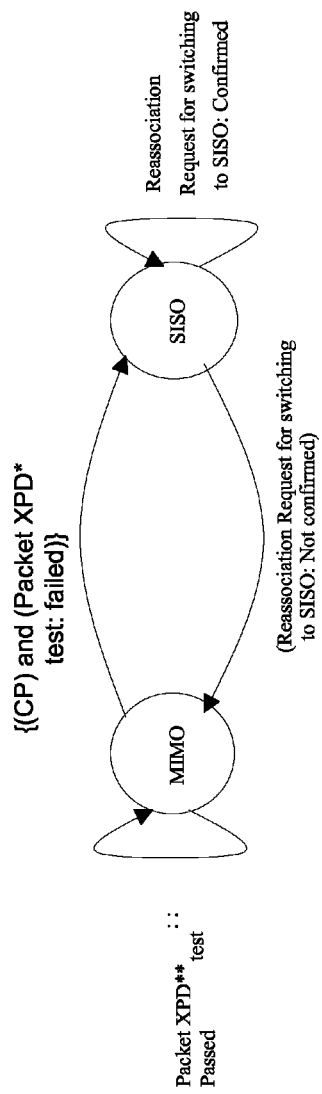
FIG. 6 is a state transition diagram depicting how a node that is in MIMO mode may transition to non-MIMO mode according to one embodiment of the present invention.

FIG. 6 depicts the state transition diagram for a subscriber unit that is initially in MIMO mode and may change to SISO mode. As long as the XPD is sufficiently high, the subscriber unit remains in MIMO mode. If the XPD test fails, the subscriber unit waits for CP and switches to SISO mode and sends a Reassociation Request indicating SISO mode is now set. If this Reassociation Request is confirmed with a Reassociation Response indicating that SISO mode is now set, the subscriber unit remains in SISO mode. Otherwise, the subscriber unit returns to MIMO mode. Also, in addition to confirming with a Reassociation Request, access point 102 moves the subscriber unit from the MIMO mode list to the SISO mode list.

Figure 7:
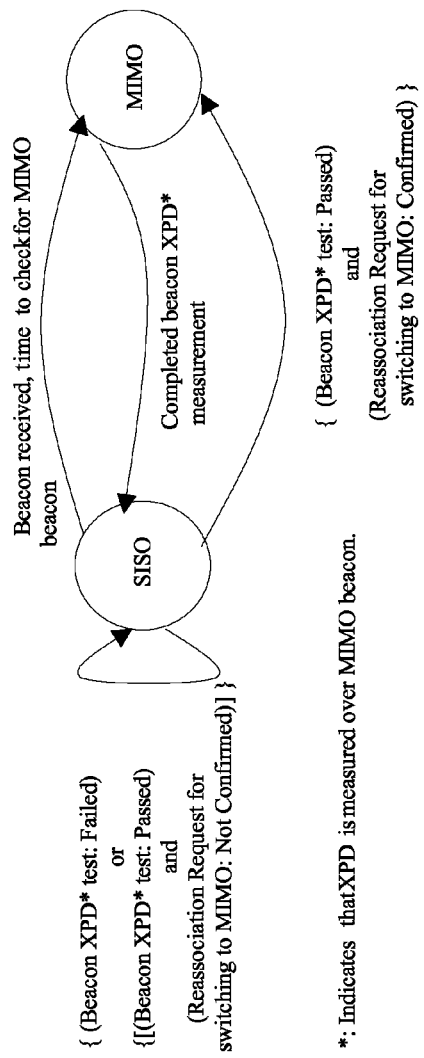
FIG. 7 is a state transition diagram depicting how a node that is in non-MIMO mode may transition to MIMO mode according to one embodiment of the present invention.

FIG. 7 depicts the state transition diagram for a subscriber unit that is initially in SISO mode and may change to MIMO mode. The subscriber unit shifts to MIMO mode at the scheduled time of the MIMO beacon and then shifts back to SISO mode after monitoring the beacon and measuring XPD. If the XPD test fails, the subscriber unit then remains in SISO mode. If the XPD test passes, the subscriber unit sends its Association Request indicating a shift to MIMO mode. If a confirmation is received, the subscriber unit shifts to MIMO mode. Access point 102 also moves the entry for the subscriber unit from the SISO list to the MIMO list. If the Association Request is not confirmed, the subscriber unit remains in SISO mode.

Figure 8:
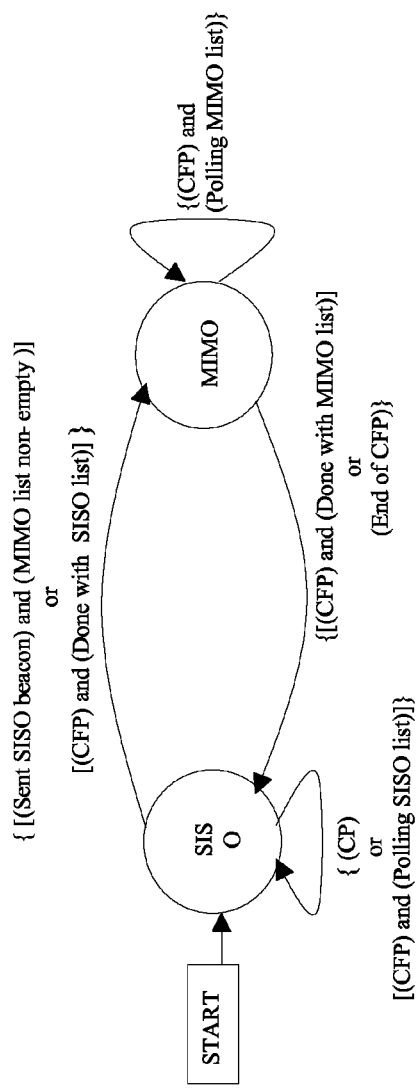
FIG. 8 is a state transition diagram depicting how an access point may switch between MIMO mode and non-MIMO mode according to one embodiment of the present invention.

FIG. 8 depicts the state transition diagram for access point 102. During the CP, and also during the CFP when polling the SISO subscriber units, access point 102 remains in SISO mode. Access point 102 shifts to MIMO mode to send a MIMO beacon whenever the SISO beacon has just been sent and there is at least one listed subscriber unit in MIMO-mode. Access point 102 also shifts from SISO mode to MIMO mode during the CFP after the SISO subscriber units have been polled if there is time to again poll the MIMO subscriber units. Access point 102 remains in MIMO mode during the CFP while polling MIMO-mode subscriber units and then returns to SISO mode after completion of polling of the MIMO-mode subscriber units or at the end of the CFP.

It will be seen that MIMO capability has been brought to an IEEE 802.11 network without sacrificing backward compatibility. Also, mechanisms for shifting to and from MIMO mode depending on channel conditions have been provided.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, it will be appreciated that although the present invention has been explained with reference to an IEEE 802.11 wireless network, it will find application in other types of network as well.

The invention claimed is:

1. A method comprising:
   communicating with a plurality of nodes in a wireless communication network, at least one of said plurality of nodes operating in a Multiple Input Multiple Output (MIMO) mode and at least one of said plurality of nodes operating in a non-MIMO mode;
   maintaining a list of said nodes operating in said MIMO mode and said nodes operating in said non-MIMO mode, said list generated based on communication with said plurality of nodes; and
   updating said list upon one of said plurality of nodes switching between said non-MIMO mode and said MIMO mode, wherein said node switches modes upon receiving a transmission wherein channel conditions meet specified conditions.

2. The method of claim 1 further comprising maintaining a list of non-MIMO capable subscriber units.

3. The method of claim 1 further comprising transmitting an end message in both MIMO and non-MIMO modes.

4. The method of claim 1 wherein measurements are made at MIMO-capable subscriber nodes on MIMO transmissions received while the nodes are operating in said MIMO mode.

5. The method of claim 1 further comprising transmitting or receiving association, reassociation, disassociation, and response frames.

6. The method of claim 5 wherein at least some of the frames are augmented with a MIMO information element that specifies MIMO mode operation.

7. The method of claim 1 further comprising transmitting an IEEE 802.11 reassociation request comprising a MIMO status information element.

8. The method of claim 1 further comprising:
   receiving an association request comprising a MIMO information element specifying said MIMO mode operation from a MIMO capable subscriber unit;
   transmitting an association response comprising the MIMO information element; and
   adding the MIMO capable subscriber unit to the list of nodes operating in said MIMO mode.

9. The method of claim 1 wherein said list includes at least one non-MIMO capable node.

10. A method comprising:
    communicating in a wireless communication network;
    transmitting an association request comprising a Multiple Input Multiple Output (MIMO) information element indicating MIMO mode operation; and
    transmitting data in said (MIMO) mode;
    wherein transmitting data comprises transmitting data at twice a data rate of IEEE 802.11a nodes with a same constellation and coding rate; and
    wherein a Media Access Control (MAC) layer packet is divided into two for transmission of said data via two spatial subchannels and a length field of a physical layer header is set to one half of the length of a Media Access Control (MAC) layer packet.

11. The method of claim 10 further comprising transmitting an association request to a non-MIMO capable access point, receiving an association response without a MIMO information element, and operating in Single Input Single Output (SISO) mode.

12. The method of claim 10 further comprising performing a handshake with an access point before switching between said MIMO mode and a non-MIMO mode.

13. The method of claim 10 further comprising maintaining a list of nodes operating in said MIMO mode and said nodes operating in a non-MIMO mode.

14. An apparatus comprising:
    a Multiple Input Multiple Output (MIMO)-capable physical layer transceiver for communication in a wireless communication network;
    a plurality of antennas;
    a processor for processing a weighting matrix to convert time domain sample streams output from each of a plurality of spatial subchannels to signals driving each of the antennas or antenna polarizations;
    a Medium Access Control (MAC) layer block that measures a received transmission to determine channel conditions, and upon receiving a transmission wherein said channel conditions meet specified conditions, requests an access point for permission to switch between a non-MIMO mode and a MIMO mode, and upon receiving permission, switches between said non-MIMO mode and said MIMO mode; and
    a decode block, wherein output from the decode block is recombined into Media Access Control (MAC) layer packets by a MAC layer processor shared with a transmitter.

15. The apparatus of claim 14 wherein the weighting matrix is derived from a channel estimate.

16. The apparatus of claim 15 wherein the channel estimate is enhanced with signal to interference plus noise ratio information.

17. The apparatus of claim 14 wherein the weighting matrix is adjusted prior to IFFT (Inverse Fast Fourier Transform) and adjusted for each subcarrier.

18. The apparatus of claim 14 wherein the weighting matrix comprises a 2×2 matrix.

19. The apparatus of claim 14 wherein the processor is further operable to combine outputs of a decode block into Media Access Control (MAC) layer packets.

20. The apparatus of claim 14 wherein the processor is further operable to receive a request from a node wanting to switch between a MIMO mode and a non-MIMO mode.

* * * * *